(12) United States Patent
Koyama

(10) Patent No.: US 8,888,293 B2
(45) Date of Patent: Nov. 18, 2014

(54) IMAGE PROJECTION APPARATUS HAVING AN INSERTABLE AND EXTRACTABLE OPTICAL ELEMENT

(75) Inventor: Takehiro Koyama, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 325 days.

(21) Appl. No.: 13/356,714

(22) Filed: Jan. 24, 2012

(65) Prior Publication Data

US 2012/0194786 A1 Aug. 2, 2012

(30) Foreign Application Priority Data

Jan. 28, 2011 (JP) .................................. 2011-017189

(51) Int. Cl.
| | |
|---|---|
| G03B 21/14 | (2006.01) |
| G03B 21/28 | (2006.01) |
| G03B 21/16 | (2006.01) |
| H04N 9/31 | (2006.01) |
| G03B 33/12 | (2006.01) |
| G02B 27/10 | (2006.01) |
| G02B 27/14 | (2006.01) |
| G03B 21/43 | (2006.01) |
| G02B 27/09 | (2006.01) |
| G03B 21/00 | (2006.01) |

(52) U.S. Cl.
CPC .............. H04N 9/3141 (2013.01); G03B 33/12 (2013.01); G02B 27/10 (2013.01); G02B 27/149 (2013.01); H04N 9/3105 (2013.01); G03B 21/43 (2013.01); G03B 21/14 (2013.01); G02B 27/0905 (2013.01); G03B 21/16 (2013.01); G03B 21/006 (2013.01)
USPC .................. 353/31; 353/119; 353/81; 353/84; 353/61

(58) Field of Classification Search
CPC ........ G03B 21/14; G03B 21/16; G03B 21/43; G02B 27/10; G02B 27/0905; H04N 2201/0422
USPC .......................... 353/31, 119, 122, 81, 84, 61
See application file for complete search history.

(56) References Cited

U.S. PATENT DOCUMENTS 5,978,054 A * 11/1999 Fujimori .......................... 349/60

FOREIGN PATENT DOCUMENTS

| CN | 1326105 A | 12/2001 |
|---|---|---|
| CN | 200965613 Y | 10/2007 |

(Continued)

OTHER PUBLICATIONS

Notification of the First Office Action for corresponding CN 201210015527.2, dated Dec. 19, 2013. English translation provided.

*Primary Examiner* — Georgia Y Epps
*Assistant Examiner* — Magda Cruz
(74) *Attorney, Agent, or Firm* — Rossi, Kimms & McDowell LLP

(57) ABSTRACT

The image projection apparatus includes light modulation elements, a color separation/combination optical system (β) configured to, in a specific cross section, separate light source light into plural color lights, introduce the color lights to the corresponding light modulation elements, combine the modulated color lights and introduce the combined color lights to a projection optical system, a holding member holding the color separation/combination optical system, an electrical circuit substrate attached to the holding member parallel to the specific cross section and electrically connected to the light modulation elements, and an optical element insertable into and extractable from the color separation/combination optical system. The holding member has a configuration allowing, in a direction orthogonal to the specific cross section on an opposite side to an electrical circuit substrate side, the insertion/extraction of the optical element into and from the color separation/combination optical system.

4 Claims, 7 Drawing Sheets

(56) References Cited

FOREIGN PATENT DOCUMENTS

| | | |
|---|---|---|
| CN | 101614945 A | 12/2009 |
| JP | 2003-215701 A | 7/2003 |
| JP | 2005-084596 A | 3/2005 |
| JP | 2006-011041 A | 1/2006 |
| JP | 2008-151844 A | 7/2008 |
| JP | 2009-169042 A | 7/2009 |

* cited by examiner

US 8,888,293 B2

IMAGE PROJECTION APPARATUS HAVING AN INSERTABLE AND EXTRACTABLE OPTICAL ELEMENT

BACKGROUND OF THE INVENTION

1. Field of the Invention

The present invention relates to an image projection apparatus, such as a liquid crystal projector, which allows insertion and extraction (attachment and detachment) of an optical element constituting part of an optical system.

2. Description of the Related Art

Image projection apparatuses such as liquid crystal projectors introduce high intensity light emitted from a light source to a light modulation element such as a liquid crystal panel through an optical system constituted by various optical elements, and introduce the light modulated by the light modulation element to a projection lens through the optical system to project the modulated light onto a projection surface.

The optical elements constituting the above-mentioned optical system include a plastic optical element whose durability to high intensity light is lower than those of optical elements made of inorganic materials such as glass and which thereby requires replacement thereof after a predetermined use time. Especially, light density is high around the light modulation element where the light from the light source is condensed, which may inevitably make it necessary to replace the plastic optical element such as a polarizing element disposed around the light modulation element.

For example, Japanese Patent Laid-Open No. 2003-215701 discloses a projector including a color separation/combination optical system that separates light from a light source into plural color lights to introduce the respective color lights to plural light modulation elements and combines the color lights modulated by the light modulation elements to introduce the combined color lights to a projection lens. This projector has a configuration that replaceably (insertably and extractably) holds a polarizing plate as an optical element constituting part of the color separation/combination optical system.

As disclosed in Japanese Patent Laid-Open No. 2003-215701, a direction in which the replaceable optical element constituting part of the conventional color separation/combination optical system is inserted thereinto and extracted therefrom is same as that in which a flexible wiring substrate is extended from the light modulation element, the flexible wiring substrate connecting the light modulation element with an electrical circuit substrate that drives the light modulation element. In this case, in order to insert and extract the optical element into and from the color separation/combination optical system, it is necessary to detach the flexible wiring substrate from the electrical circuit substrate or separate the electrical circuit substrate from the color separation/combination optical system.

However, such detachment of the flexible wiring substrate provided for the light modulation element from the electrical circuit substrate may require, when the flexible wiring substrate is again connected to the electrical circuit substrate after the replacement of the optical element, adjustment of a driving voltage of the light modulation element in consideration of individual differences of characteristics of light modulation elements. Moreover, static electricity existing on an assembler may generate unnecessary electric current flowing from the flexible wiring substrate to the light modulation element, which may cause a defective operation of the light modulation element. Furthermore, the detachment of the electrical circuit substrate is an extremely extensive work, which is undesirable.

SUMMARY OF THE INVENTION

The present invention provides an image projection apparatus allowing easy insertion and extraction (replacement) of an optical element constituting part of a color separation/combination optical system, without disconnecting electrical connection between a light modulation element and an electric circuit substrate, and without separating the electric circuit substrate from the color separation/combination optical system.

The present invention provides as one aspect thereof an image projection apparatus including plural light modulation elements, a color separation/combination optical system configured to, in a specific cross section, separate light from a light source into plural color lights, introduce the respective color lights to the corresponding light modulation elements, combine the color lights modulated by the light modulation elements, and introduce the combined color lights to a projection optical system, an optical system holding member configured to hold the color separation/combination optical system, an electrical circuit substrate attached to the optical system holding member parallel to the specific cross section, and electrically connected to the light modulation elements, and an optical element insertable into and extractable from the color separation/combination optical system. The optical system holding member has a configuration allowing, in a direction orthogonal to the specific cross section on an opposite side to a side on which the electrical circuit substrate is attached, the insertion and extraction of the optical element into and from the color separation/combination optical system.

Further features and aspects of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Embodiment 1

Figure 1:
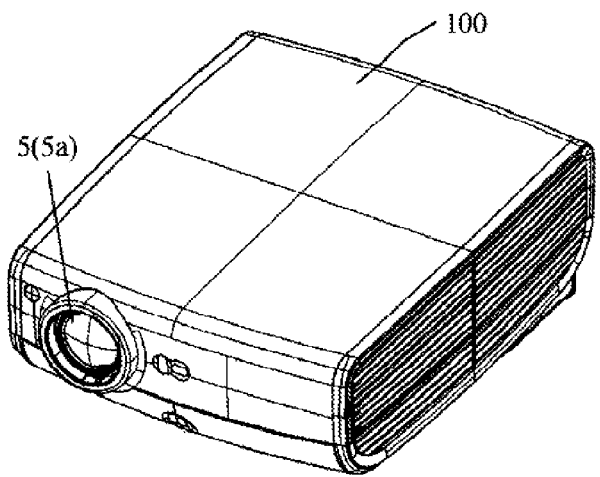
FIG. 1 is a perspective view showing an exterior of a projector that is Embodiment 1 of the present invention.

FIG. 1 shows an exterior of a liquid crystal projector (image projection apparatus) that is a first embodiment (Embodiment 1) of the present invention. Reference numeral 5 denotes a projection lens unit that holds a projection lens 5a as a projection optical system thereinside.

Although this embodiment describes the liquid crystal projector using a liquid crystal panel as a light modulation element, other image projection apparatuses as alternative embodiments of the present invention use other light modulation elements such as a digital micromirror device (DMD).

Figures 2A, 2B:
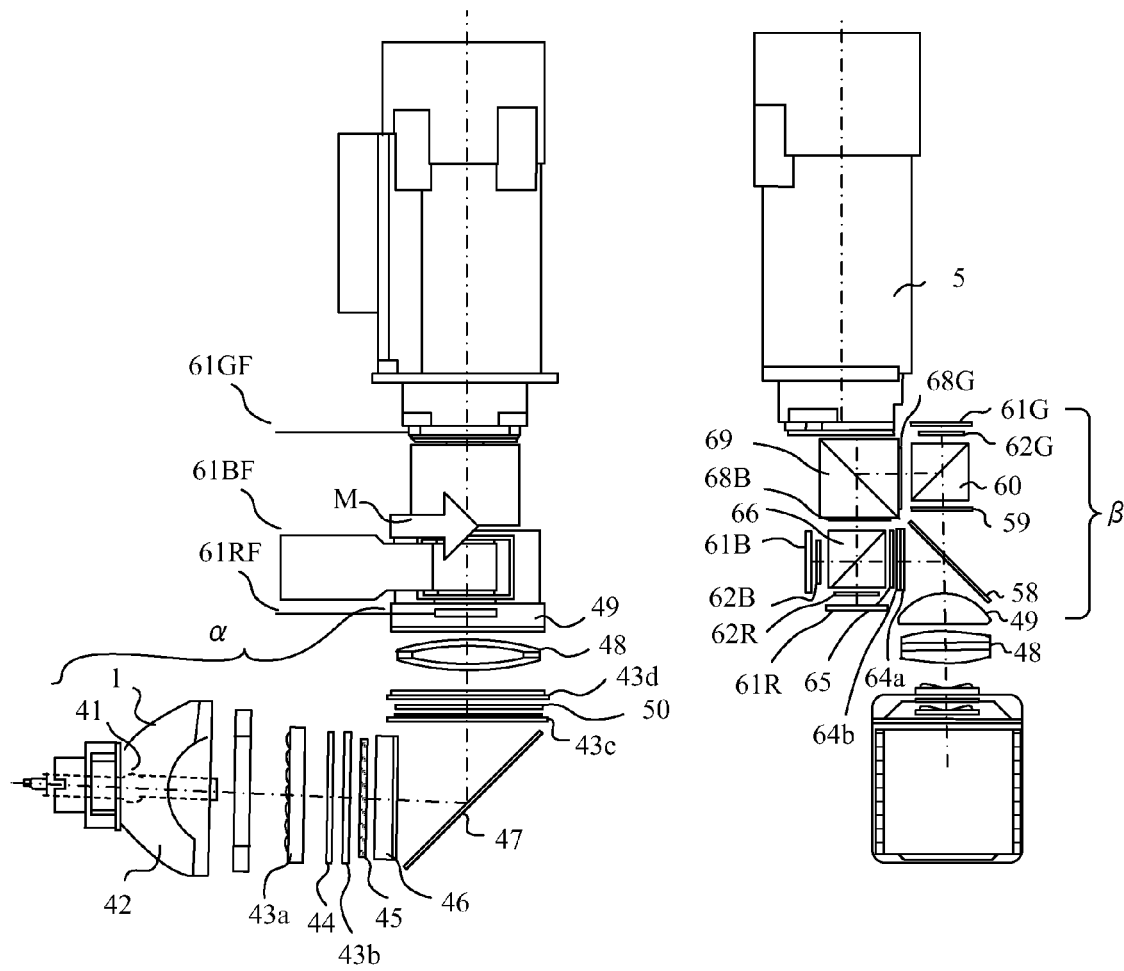
FIGS. 2A and 2B are horizontal and vertical cross-sectional views of the optical configuration of the projector of Embodiment 1.

FIGS. 2A and 2B show the configuration of an optical system of the liquid crystal projector of this embodiment. FIG. 2A shows a horizontal cross section of the optical system, and FIG. 2B shows a vertical cross section thereof.

In these figures, reference numeral 41 denotes a discharge light emitting tube that emits white light, and reference numeral 42 denotes a reflector that reflects the light emitted from the discharge light emitting tube 41 in a predetermined direction and collects it. The discharge light emitting tube 41 and reflector 42 constitute a light source lamp 1.

Reference numeral 43a denotes a first cylinder array that includes plural cylindrical lens cells each having a refractive power in a horizontal direction shown in FIG. 2A. Reference numeral 43b denotes a second cylinder array that includes plural cylindrical lens cells corresponding to the respective cylindrical lens cells of the first cylinder array 43a. Reference numeral 44 denotes an ultraviolet absorbing filter. Reference numeral 45 denotes a polarization conversion element that converts non-polarized light into polarized light having a predetermined polarization direction.

Reference numeral 46 denotes a front compressor that is constituted by a cylindrical lens having a refractive power in a vertical direction shown in FIG. 2B. Reference numeral 47 denotes a reflective mirror that bends an optical axis from the lamp 1 by approximately 90 degrees (specifically, by 88 degrees).

Reference numeral 43c denotes a third cylinder array that includes plural cylindrical lens cells each having a refractive power in the vertical direction. Reference numeral 43d denotes a fourth cylinder array that includes plural cylindrical lens cells corresponding to the respective cylindrical lens cells of the third cylinder array 43c.

Reference numeral 50 denotes a color filter that returns color light in a specific wavelength range to the lamp 1 in order to adjust chromatic coordinates to a predetermined value. Reference numeral 48 denotes a condenser lens. Reference numeral 49 denotes a rear compressor that is constituted by a cylindrical lens having a refractive power in the vertical direction. An illumination optical system α is thus configured.

Reference numeral 58 denotes a dichroic mirror that reflects light in a wavelength range of blue (B) (for example, 430-495 nm) and light in a wavelength range of red (R) (for example, 590-650 nm), and transmits light in a wavelength range of green (G) (for example, 505-580 nm). Reference numeral 59 denotes a G-entrance side polarizing plate that is formed by attaching a polarizing element to a transparent substrate, and that transmits only P-polarized light. Reference numeral 60 denotes a first polarization beam splitter that includes a polarization beam splitting surface formed by a multilayer film, transmitting P-polarized light and reflecting S-polarized light.

Reference numerals 61R, 61G and 61B denotes an R-reflective liquid crystal panel, a G-reflective liquid crystal panel and a B-reflective liquid crystal panel, respectively, each of which is a light modulation element (or an image forming element) reflecting and image-modulating entering light. Reference numerals 61RF, 61GF and 61BF denote flexible wiring substrates that are respectively connected to the liquid crystal panels 61R, 61G and 61B. Reference numerals 62R, 62G and 62B denote an R-quarter wave plate, a G-quarter wave plate and a B-quarter wave plate.

Reference numeral 64a denotes a trimming filter that returns orange light to the lamp 1 to improve chromatic purity of the R light. Reference numeral 64b denotes an RB-entrance side polarizing plate that is formed by attaching a polarizing element on a transparent substrate and transmits only P-polarized light.

Reference numeral 65 denotes a color selective phase plate that changes the polarization direction of the R light by 90 degrees and does not change the polarization direction of the B light. Reference numeral 66 denotes a second polarization beam splitter that has a polarization beam splitting surface transmitting P-polarized light and reflecting S-polarized light.

Reference numeral 68B denotes a B-exit side polarizing plate that transmits only an S-polarized light component of the B light. Reference numeral 68G denotes a G-exit side polarizing plate that transmits only an S-polarized light component of the G light. Reference numeral 69 denotes a dichroic prism that transmits the R light and the B light, and reflects the G light.

The above-described elements from the dichroic mirror 58 to the dichroic prism 69 constitute a color separation/combination optical system β.

In the optical system thus configured, the light from the light source lamp 1 enters the first cylinder array 43a to be divided into plural light fluxes and collected, the plural collected light fluxes becoming band-shaped light fluxes arranged in vertical direction. The plural divided light fluxes pass through the ultraviolet absorbing filter 44 and the second cylinder array 43b to form plural light source images near the polarization conversion element 45.

The polarization conversion element 45 converts the non-polarized light from the lamp 1 into S-polarized light. The plural light fluxes as the S-polarized light exiting from the polarization conversion element 45 are compressed by the front compressor 46, reflected by the reflective mirror 47 and then enter the third cylinder array 43c.

Each light flux entering the third cylinder array 43c is divided into plural light fluxes and collected, the plural collected light fluxes becoming plural band-like light fluxes arranged in the horizontal direction. The plural divided light fluxes enter the rear compressor 49 through the fourth cylinder array 43d and the condenser lens 48.

Optical actions of the front compressor 46, the condenser lens 48 and the rear compressor 49 cause rectangular images formed by the plural light fluxes to overlap each other, thereby forming a rectangular illumination area (actually, three illumination areas) having an even luminance. The reflective liquid crystal panels 61R, 61G and 61B are arranged in the illumination areas.

The S-polarized light exiting from the polarization conversion element 45 enters the dichroic mirror 58. The G light transmitted through the dichroic mirror 58 enters the G-entrance side polarizing plate 59. The G light remains as P-polarized light (S-polarized light relative to the polarization conversion element 45) after color separation by the dichroic mirror 58. Then, the G light exits from the G-entrance side polarizing plate 59, enters the first polarization beam splitter 60 as P-polarized light, and then is transmitted through the polarization beam splitting surface thereof to reach the G-reflective liquid crystal panel 61G.

The G light is reflected and image-modulated by the G-reflective liquid crystal panel 61G. A P-polarized light component of the image-modulated G light is again transmitted through the polarization beam splitting surface of the first polarization beam splitter 60 to be returned toward the light source, thereby being removed from light for projection. On the other hand, an S-polarized light component of the image-modulated G light is reflected by the polarization beam splitting surface of the first polarization beam splitter 60 to be introduced toward the dichroic prism 69 as the light for projection.

The G light exiting from the first polarization beam splitter 60 enters the dichroic prism 69 as S-polarized light, and is reflected by a dichroic film of the dichroic prism 69 to reach the projection lens unit 5.

On the other hand, the R and B lights reflected by the dichroic mirror 58 enter the trimming filter 64a. The R and B lights remain as P-polarized light after the color separation by the dichroic mirror 58. The R and B lights pass through the trimming filter 64a where the orange light is removed, are transmitted through the RB-entrance side polarizing plate 64b, and then enter the color selective phase plate 65.

The color selective phase plate 65 has a function of rotating only the polarization direction of the R light by 90 degrees. Thereby, the R light that is S-polarized light and the B light that is P polarized light enter the second polarization beam splitter 66.

The R light entering the second polarization beam splitter 66 as the S-polarized light is reflected by the polarization beam splitting surface of the second polarization beam splitter 66 to reach the R-reflective liquid crystal panel 61R. Moreover, the B light entering the second polarization beam splitter 66 as the P-polarized light is transmitted through the polarization beam splitting surface of the second polarization beam splitter 66 to reach the B-reflective liquid crystal panel 61B.

The R light is reflected and image-modulated by the R-reflective liquid crystal panel 61R. An S-polarized light component of the image-modulated R light is again reflected by the polarization beam splitting surface of the second polarization beam splitter 66 to be returned toward the light source, thereby being removed from the light for projection. On the other hand, a P-polarized light component of the image-modulated R light is transmitted through the polarization beam splitting surface of the second polarization beam splitter 66 to be introduced toward the dichroic prism 69 as the light for projection.

The B light is reflected and image-modulated by the B-reflective liquid crystal panel 61B. A P-polarized light component of the image-modulated B light is again transmitted through the polarization beam splitting surface of the second polarization beam splitter 66 to be returned toward the light source, thereby being removed from the light for projection. On the other hand, an S-polarized light component of the image-modulated B light is reflected by the polarization beam splitting surface of the second polarization beam splitter 66 to be introduced toward the dichroic prism 69 as the light for projection.

The B light as the S-polarized light exiting from the second polarization beam splitter 66 is analyzed by the B-exit side polarizing plate 68B, and then enters the dichroic prism 69. The R light exiting from the second polarization beam splitter 66 is transmitted through the B-exit side polarizing plate 68B without change, and then enters the dichroic prism 69.

The R and B lights entering the dichroic prism 69 are transmitted through the dichroic film thereof, and combined with the G light reflected by the dichroic film to reach the projection lens 5a in the projection lens unit 5. The combined R, G and B lights are projected with enlargement by the projection lens 5a onto a projection surface such as a screen.

Figure 3:
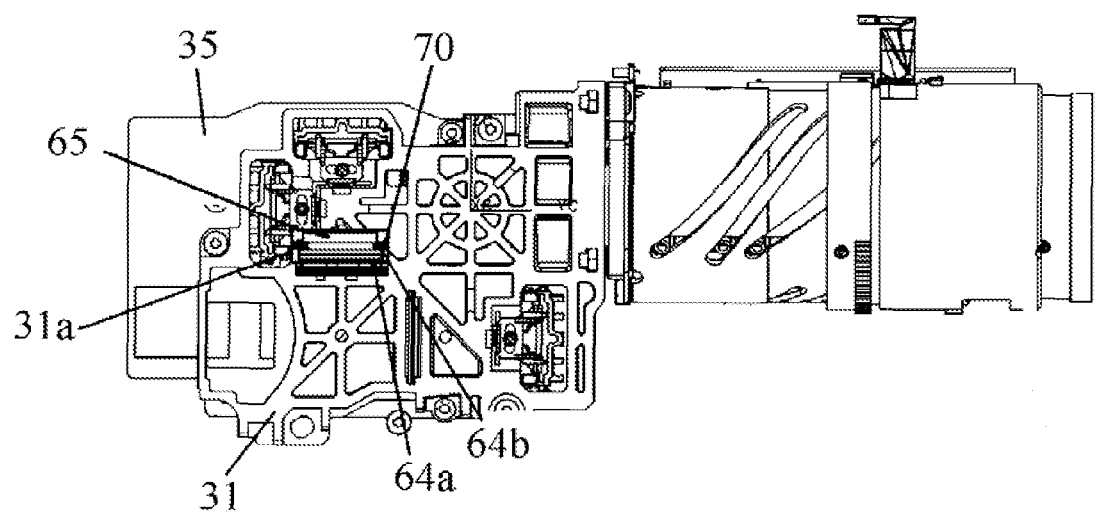
FIG. 3 is a side view of a color separation/combination prism holder and a projection lens unit provided in the projector of Embodiment 1.
Figure 4A:
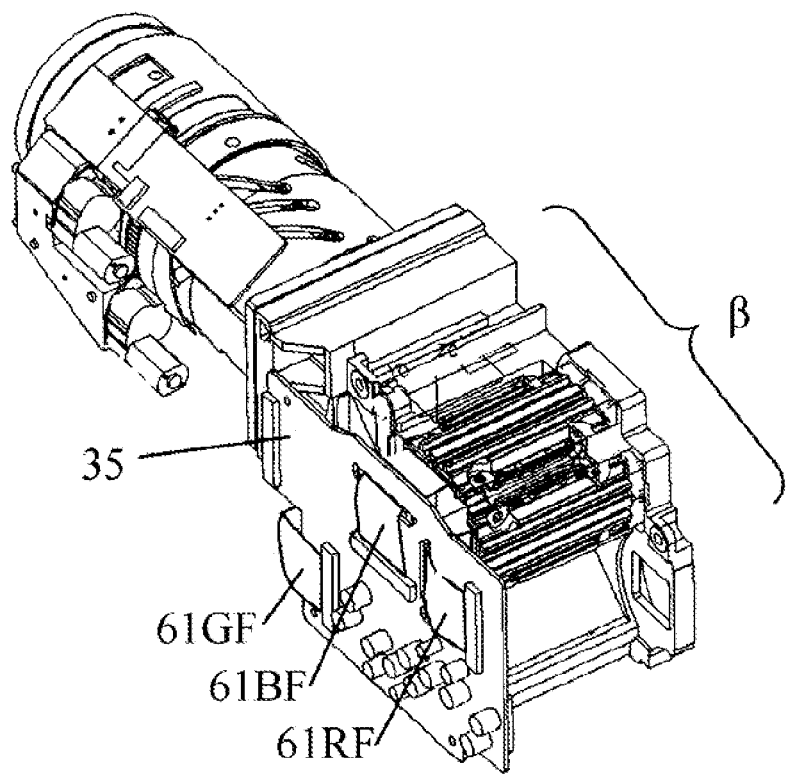
FIGS. 4A and 4B are upper side and lower side perspective views of the color separation/combination prism holder and the projection lens unit.
Figure 4B:
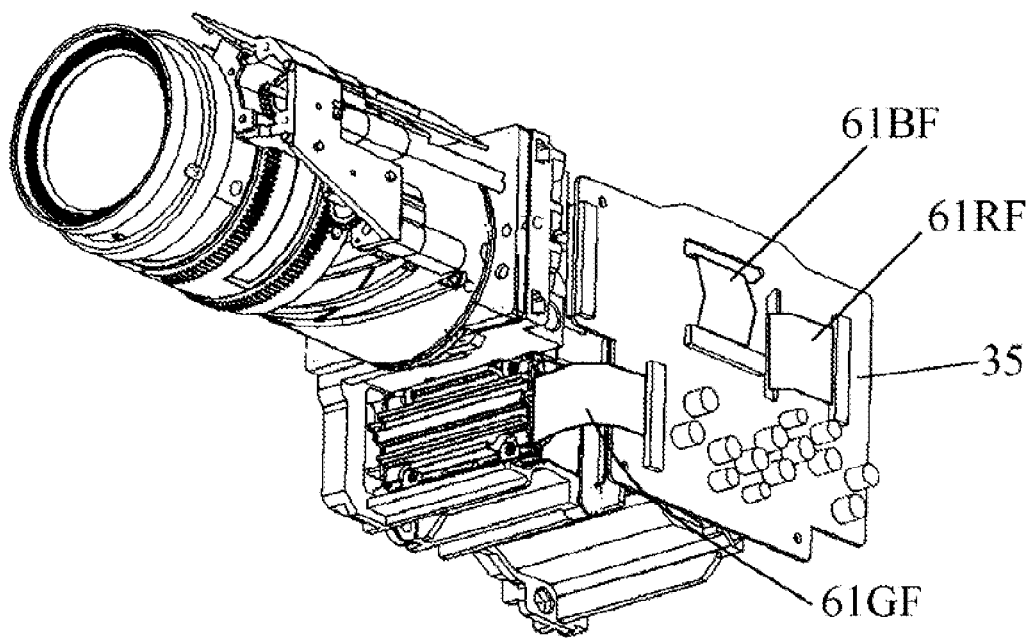

FIGS. 3, 4A and 4B show a prism base 31 as an optical system holding member that holds the color separation/combination optical system β, a projection lens unit 5 that is fixed to the prism base 31, and an RGB substrate 35 as an electrical circuit substrate that is attached to the prism base 31.

As described above, the color separation/combination optical system β performs the color separation and the color combination in the vertical cross section shown in FIG. 2B and corresponding to a specific cross section. That is, the color separation/combination optical system β separates the light from the light source into plural color lights to introduce the respective color lights to the R-, G- and B-liquid crystal panels 61R, 61G, and 61B. In addition, the color separation/combination optical system β combines the color lights modulated by the R-, G- and B-reflective liquid crystal panels 61R, 61G and 61B to introduce the modulated color lights to the projection lens 5a.

The RGB substrate 35 is disposed along (that is, parallel to) the vertical cross section shown in FIG. 2B, and attached to a one side face of the prism base 31 in a direction (horizontal direction) orthogonal to the vertical cross section.

The flexible wiring substrates 61RF, 61GF and 61BF are respectively extended from the R-, G- and B-liquid crystal panels 61R, 61G and 61B toward the RGB substrate 35 in the horizontal direction as shown in FIGS. 4A and 4B. The flexible wiring substrates 61RF, 61GF and 61BF are extended to an opposite side (outer surface side) to a liquid crystal panel side (inner side) with respect to the RGB substrate 35 through opening portions formed in the RGB substrate 35. Then, tips of the flexible wiring substrates 61RF, 61GF and 61BF are bent along an outer surface of the RGB substrate 35 and connected to connectors provided on the outer surface of the RGB substrate 35. Thereby, the R-, G- and B-liquid crystal panels 61R, 61G and 61B are electrically connected with the RGB substrate 35.

The RGB substrate 35 drives the R-, G- and B-liquid crystal panels 61R, 61G and 61B through the flexible wiring substrates 61RF, 61GF and 61BF, and causes the R-, G- and B-liquid crystal panels 61R, 61G and 61B to form R-, G- and B-original images for respectively modulating the R, G and B lights.

The color separation/combination optical system β held by the prism base 31 includes the trimming filter 64a, the RB-entrance side polarizing plate 64b and the color selective phase plate 65, as replaceable optical elements. The trimming filter 64a, the RB-entrance side polarizing plate 64b and the color selective phase plate 65 are hereinafter referred to as replaceable optical elements 64a, 64b and 65.

In the prism base 31, in the horizontal direction orthogonal to the vertical cross section, an opposite side part to a side on which the RGB substrate is attached is formed with an opening portion 31a through which the replaceable optical elements 64a, 64b and 65 are inserted into and extracted from the color separation/combination optical system R. In other words, the opening portion 31a is formed so as to allow the extraction (removal) of the replaceable optical elements 64a, 64b and 65 in an opposite direction to a direction in which the flexible wiring substrates 61RF, 61GF and 61BF are extended from the R-, G- and B-liquid crystal panels 61R, 61G and 61B and to allow the insertion thereof in the direction in which the flexible wiring substrates 61RF, 61GF and 61BF are extended.

The replaceable optical elements (the trimming filter 64a, the RB-entrance side polarizing plate 64b and the color selective phase plate 65) are independently insertable into and extractable from the color separation/combination optical system β through the opening portion 31a. A filter holding frame (element holding member) 70 shown FIG. 3 is provided in the opening portion 31a. Of the filter holding frame 70, inner side faces located at width directional ends are formed with grooves for guiding the replaceable optical elements 64a, 64b and 65 sliding for the insertion and the extraction.

As described above, in this embodiment, the prism base 31 has a configuration allowing, in the horizontal direction orthogonal to the vertical cross section on the opposite side to the side on which the RGB substrate 35 is attached, the insertion and the extraction of the replaceable optical elements 64a, 64b and 65 into and from the color separation/combination optical system β. Thus, without detaching the flexible wiring substrates 61RF, 61GF and 61BF from the RGB substrate 35, the replaceable optical elements 64a, 64b and 65 can be replaced for the color separation/combination optical system β with no interference of the replaceable optical elements 64a, 64b and 65 with the flexible wiring substrates 61RF, 61GF and 61BF. It is also unnecessary to detach the RGB substrate 35 from the prism base 31.

Embodiment 2

Embodiment 1 shows the configuration allowing the individual insertion and extraction of the trimming filter 64a, the RB-entrance side polarizing plate 64b and the color selective phase plate 65 into and from the color separation/combination optical system β through the opening portion 31a formed in the prism base 31. However, as shown in FIG. 6, the replaceable optical elements 64a, 64b and 65 may be collectively held by a filter holder 100 that is an element holding member.

Figure 6:
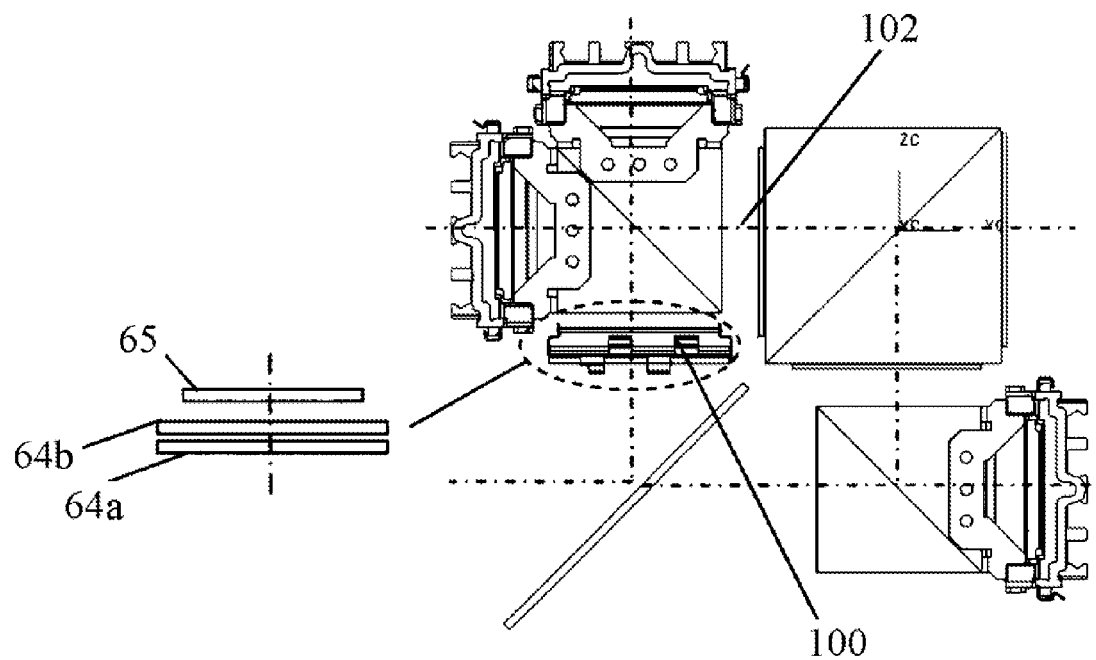
FIG. 6 is a side view of a color separation/combination optical system provided in the projector of Embodiment 2.

A left figure in FIG. 6 is an enlarged view of the replaceable optical elements (the trimming filter 64a, the RB-entrance side polarizing plate 64b and the color selective phase plate 65) held by the filter holder 100 surrounded by a dotted line in a right figure in FIG. 6.

Figure 5:
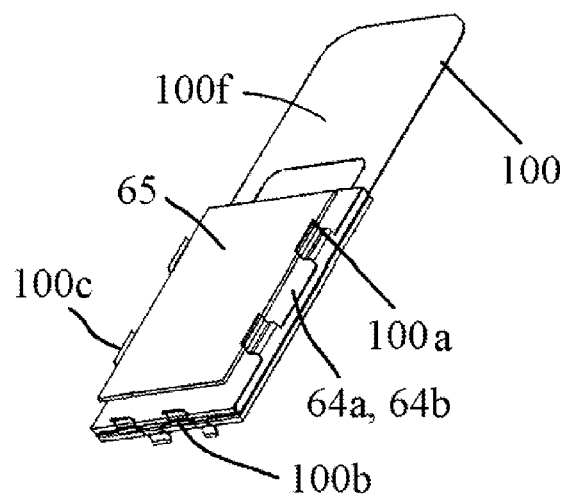
FIG. 5 is a perspective view of a replaceable holder provided in a projector that is Embodiment 2 of the present invention.

The filter holder 100 is formed of a metal sheet such as an aluminum sheet or a stainless sheet or of a resin material, so as to have a shape shown in FIG. 5. The filter holder 100 is formed with protrusions (claws) 100a, 100b and 100c for holding the replaceable optical elements 64a, 64b and 65, each protrusion having elasticity. Although the filter holder 100 collectively holds the plural replaceable optical elements, plural filter holders may be used each of which holds each replaceable optical element.

Figure 7:
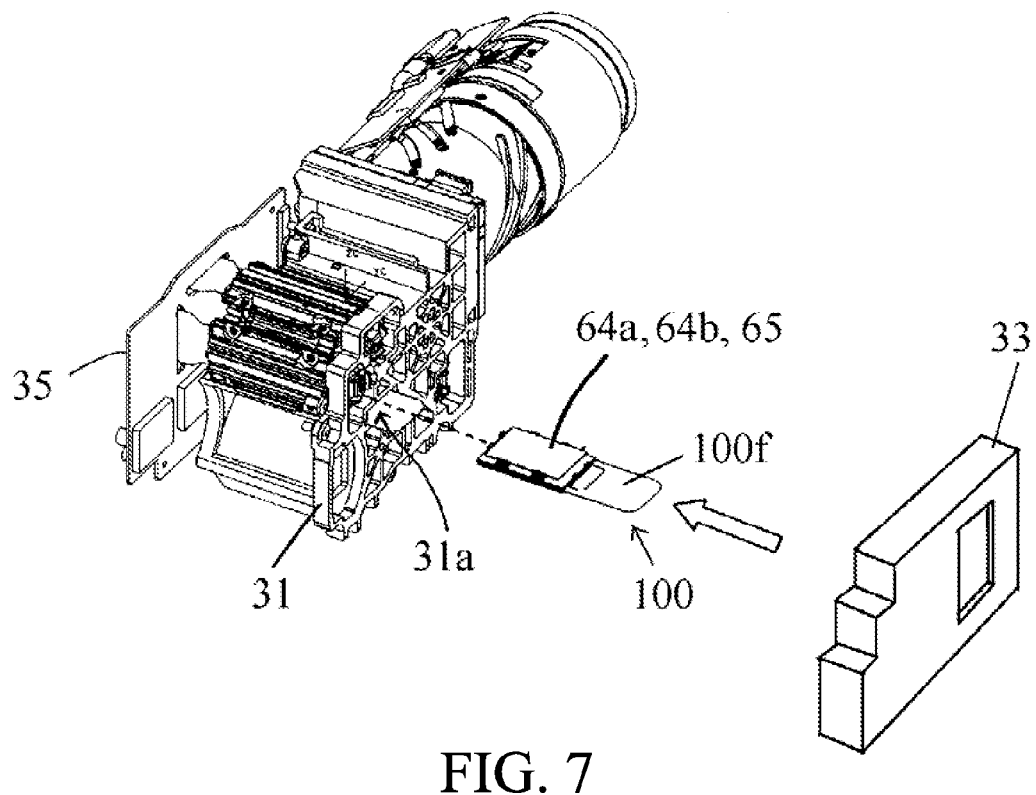
FIG. 7 is an upper side perspective view of a color separation/combination prism holder and a projection lens unit provided in the projector of Embodiment 2.

The filter holder 100 integrally holding the replaceable optical elements 64a, 64b and 65 can be inserted into and extracted from the color separation/combination optical system β through the opening portions 31a formed in the prism base 31, as shown in FIG. 7. When the filter holder 100 shown in FIGS. 5 and 7 is viewed from a direction orthogonal to an optical surface of each replaceable optical element, an end portion 100f of the filter holder 100 largely extends out with respect to the replaceable optical elements 64a, 64b and 65.

The extended end portion 100f of the filter holder 100 protrudes from the prism base 31 in a state where the filter holder 100 is inserted in the prism base 31 (that is, in the color separation/combination optical system β), which is used as an insertion/extraction knob. An assembler can pinch this extraction knob 100f to enable easy extraction and insertion of the filter holder 100 from and into the prism base 31. Although not shown, the filter holder 100 may be fixed to the prism base 31 with a screw or the like after the insertion into the color separation/combination optical system β.

Moreover, forming the filter holder 100 using a material having good thermal conductivity such as aluminum enables transmission of heat generated at the color selective phase plate 65 and the RB-entrance side polarizing plate 64b to the entire filter holder 100 through the protrusions 100a, 100b and 100c.

As shown in FIG. 7, a side duct 33 through which cooling air supplied from a cooling fan (not shown) flows to the replaceable optical elements 64a, 64b and 65 is attached to a face of the prism base 31 in which the opening portion 31a is formed. The cooling air flowing out from the side duct 33 impinges on the insertion/extraction knob 100f to take the heat from the filter holder 100. Thus, placing the insertion/extraction knob 100f in a cooling air path formed by the side duct 33 can cool the color selective phase plate 65 and the RB-entrance side polarizing plate 64b, not only by direct impingement of the cooling air thereon, but also by use of an thermal conduction effect through the filter holder 100. Thereby, it is possible to more efficiently cool the color selective phase plate 65 and the RB-entrance side polarizing plate 64b.

Figure 8:
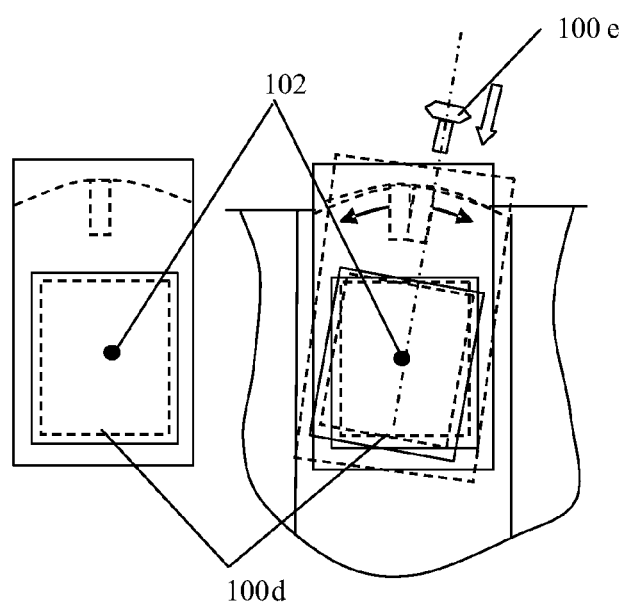
FIG. 8 shows rotation of the holder in the projector of Embodiment 2.

FIG. 8 shows a role of the filter holder 100 in the prism base 31. The filter holder 100 is provided with frame portion 100d formed thereinside to hold the replaceable optical elements 64a, 64b and 65. A peripheral part of the frame portion 100d serves as a mask to block unnecessary light in the color separation/combination optical system β. Heat generated from the mask on which the unnecessary light impinges is also cooled by the cooling air flowing from the above-described side duct 33.

In addition, a convex or concave portion having a circular arc shape whose center is located on an optical axis 102 of the color separation/combination optical system β may be formed in the filter holder 100, and similarly, a concave or convex portion having a circular arc shape may be formed in the prism base 31. Forming such convex and concave portions enables, after adjustment of a rotational position of the filter folder 100 about the optical axis 102 of the color separation/combination optical system β, fixing of the filter folder 100 to the prism base 31 with a screw 100e. In other words, forming the convex and concave portions makes it easy to adjust a polarization axis of the RB-entrance side polarizing plate 64b and a fast axis of the color selective phase plate 65 to match them with a polarization axis of the color separation/combination optical system β, which enables further improvement of performance of the color separation/combination optical system β.

Embodiment 3

Although Embodiments 1 and 2 have described the projectors using the reflective liquid crystal panel as the light modulation element, a projector (image projection apparatus) that is a third embodiment (Embodiment 3) of the present invention uses a transmissive liquid crystal panel as the light modulation element.

Figure 9:
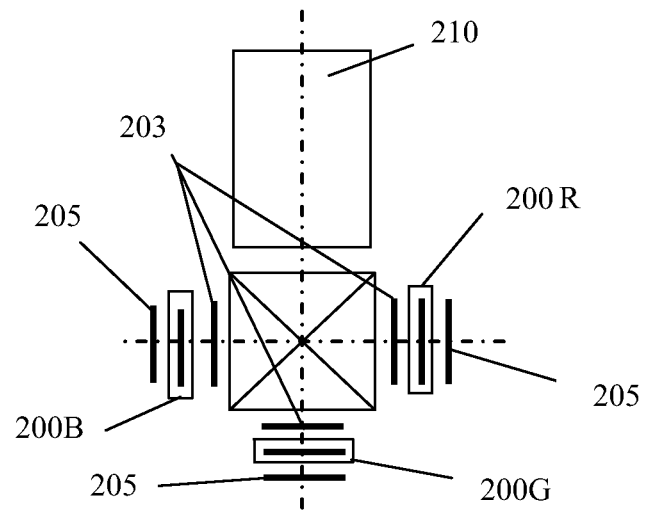
FIG. 9 is an upper side view of a color combination optical system provided in a projector that is Embodiment 3 of the present invention.

FIG. 9 is an upper side view of a color combination optical system in the transmissive liquid crystal projector of Embodiment 3. The "upper side" means an upper side when the projector is placed on a table or the like.

In a horizontal cross section shown in FIG. 9 as a specific cross section, a color separation optical system (not shown) separates light from a light source (not shown) into plural color lights to introduce the respective color lights to plural transmissive liquid crystal panels 200R, 200G and 200B. Then, the color combination optical system combines the color lights modulated by the transmissive liquid crystal panels 200R, 200G and 200B to introduce the combined color lights to a projection lens unit (projection lens) 210.

Although the color separation optical system is separated from the color combination optical system in Embodiment 3, which is different from Embodiments 1 and 2, Embodiment 3 treats the color separation and color combination optical systems collectively as a color separation/combination optical system.

Figure 10:
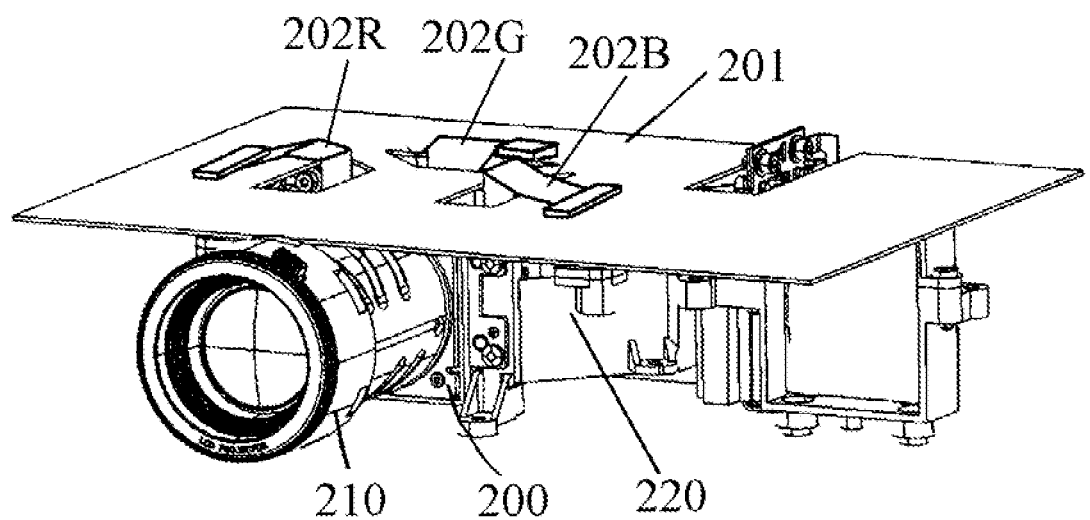
FIG. 10 is a perspective view of a color separation/combination prism holder, a projection lens unit and an electrical circuit substrate provided in the projector that is Embodiment 3, in a state where flexible wiring substrates are not connected to the electrical circuit substrate.
Figure 11A:
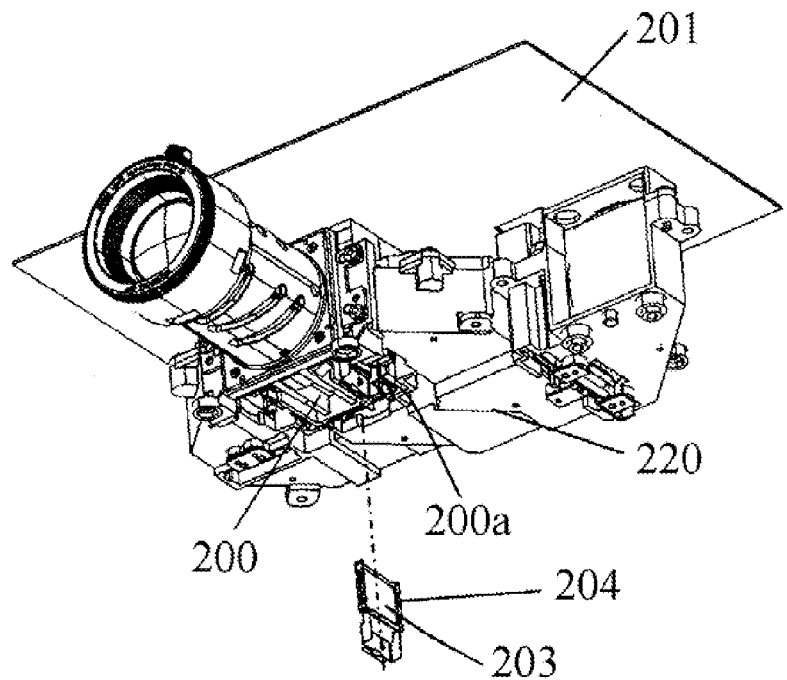
FIGS. 11A and 11B are perspective views of the color separation/combination prism holder, the projection lens unit and the electrical circuit substrate provided in the projector of Embodiment 3, in a state where the flexible wiring substrates are connected to the electrical circuit substrate.

As shown in FIGS. 10 and 11A, the color separation/combination optical system is held by an optical system holder 200. In these figures, the color separation optical system of the color separation/combination optical system is housed in an optical box 220 together with an illumination optical system (not shown) that introduces light from a light source lamp (not shown).

As shown in FIG. 10, flexible wiring substrates 202R, 202G and 202B are extended out from the transmissive liquid crystal panels 200R, 200G and 200B upward in the projector Moreover, as shown in FIG. 10, general transmissive liquid crystal projectors are often provided with a single electrical circuit substrate including a driving circuit substrate that drives the transmissive liquid crystal panels 200R, 200G and 200B and a controlling circuit substrate that controls the entire projector. A main circuit substrate 201 that is the single electrical circuit substrate is disposed along (parallel to) the cross section shown in FIG. 9 and so as to extend along the optical system holder 200 and the entire optical box 220. The main circuit substrate 201 is attached to one end face of the optical system holder 200 in a direction orthogonal to the cross section shown in FIG. 9.

The main circuit substrate 201 is formed with opening portions through which the flexible wiring substrates 202R, 202G and 202 are extended upward from the transmissive liquid crystal panels 200R, 200G and 200B. Tips of the flexible wiring substrates 202R, 202G and 202B extended through the opening portions and bent along an opposite side face (upper surface) of the main circuit substrate 201 to a transmissive liquid crystal panel side face thereof are connected to connectors provided on the upper surface of the main circuit substrate 201.

As shown in FIG. 9, each of optical paths in which the separated color lights are transmitted through the transmissive liquid crystal panels 200R, 200G and 200B is provided with an entrance side polarizing plate 205 and an exit side polarizing plate 203 on an entrance side and an exit side of each transmissive liquid crystal panel, respectively. The exit side polarizing plate 203 is more prone to have a high temperature as compared to the entrance side polarizing plate 205, so that it is desirable that the exit side polarizing plate 203 be replaced every predetermined use time in order to guarantee its performance.

This embodiment enables replacement of the exit side polarizing plate 203 without detaching the flexible wiring substrates 202R, 202G and 202B from the main circuit substrate 201 and without detaching the main circuit substrate 201 from the optical system holder 200. Therefore, as shown in FIG. 11A, in a vertical direction orthogonal to the horizontal cross section, a lower face of the optical system holder 200, which is an opposite side face to a side on which the main circuit substrate 201 is attached, is formed with an opening portion 200a allowing insertion and extraction of the exit side polarizing plate 203 into and from the color separation/combination optical system therethrough. In other words, the opening portion 200a is formed so as to allow the extraction (removal) of the exit side polarizing plate 203 in an opposite direction to a direction in which the flexible wiring substrates 202R, 202G and 202B are extended from the transmissive liquid crystal panels 200R, 200G and 200B, and so as to allow the insertion thereof in the direction in which the flexible wiring substrates 202R, 202G and 202B are extended therefrom.

The exit side polarizing plate 203 is held by a polarizing plate holder 204 that is an element holding member, and is insertable into and extractable from the color separation/combination optical system with the polarizing plate holder 204 through the opening portion 200a, as well as in Embodiment 2. Although not shown, in a case of forming the exit side polarizing plate 203 by using plural polarizing plates whose optical characteristics are mutually different, the plural polarizing plates may be collectively held by a single polarizing plate holder. The polarizing plate holder 204 may be fixed to the optical box 220 with a screw or the like after the insertion into the color separation/combination optical system β.

Figure 11B:
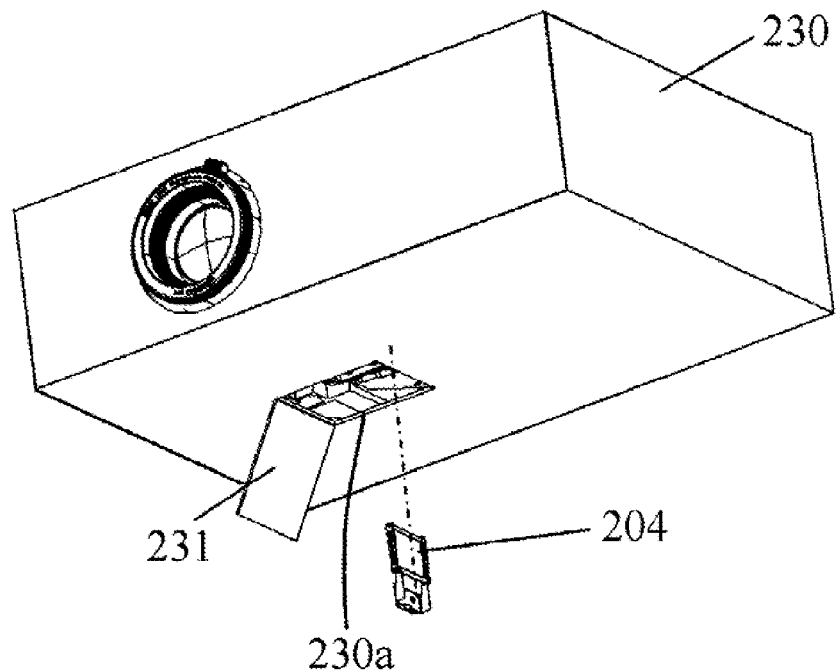

FIG. 11B shows a state where the main circuit substrate 201, the optical system holder 200 and the optical box 220 are housed in an exterior case 230 of the projector. A lower face of the exterior case 230 is formed with a replacement opening 230a through which the exit side polarizing plate 203 held by the polarizing plate holder 204 is replaced. The replacement opening 230a is opened and shut by a lid 231. Thus, the exit side polarizing plate 203 can be replaced only by opening the lid 231, without exposing the entire optical system holder 200 by dissolving the exterior case 230.

Each embodiment described above is merely a typical example, and it various transforms and it can change for each embodiment before the execution of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-017189, filed on Jan. 28, 2011 which is hereby incorporated by reference herein in its entirety.

What is claimed is:

1. An image projection apparatus comprising:
   plural light modulation elements;
   a color separation/combination optical system configured to, in a specific cross section, separate light from a light source into plural color lights, introduce the respective color lights to the corresponding light modulation elements, combine the color lights modulated by the light modulation elements, and introduce the combined color lights to a projection optical system;

an optical system holding member configured to hold the color separation/combination optical system;

an electrical circuit substrate attached to the optical system holding member parallel to the specific cross section, and electrically connected to the light modulation elements; and an optical element provided separately from the light modulation elements and being insertable into and extractable from the color separation/combination optical system independently of the light modulation elements, wherein the optical system holding member has a configuration allowing, in a direction orthogonal to the specific cross section on an opposite side to a side on which the electrical circuit substrate is attached, the insertion and extraction of the optical element into and from the color separation/combination optical system.

2. An image projection apparatus according to claim 1, wherein the optical element is held by an element holding member, and wherein the element holding member is provided with an insertion/extraction knob that protrudes from the optical system holding member in a state where the optical element is inserted into the color separation/combination optical system, and wherein the insertion/extraction knob is disposed in a cooling air path in which air for cooling the optical element flows.

3. An image projection apparatus according to claim 2, wherein the element holding member has a configuration allowing adjustment of a rotational position of the optical element, in a state where the optical element is inserted in the color separation/combination optical system.

4. An image projection apparatus according to claim 1, wherein:

the color separation/combination optical system includes at least two light separation elements for at least one of separation of the light from the light source and combination of the color lights; and the optical element is insertable into and extractable from between the two light separation elements.

* * * * *